INSECTICIDES

Richard Sehring, Bahnhofstrasse 65, and Karl Zeile, Taunusstrasse 11, both of Ingelheim am Rhine, Germany
No Drawing. Filed Nov. 6, 1964, Ser. No. 409,552
6 Claims. (Cl. 167—30)

This is a continuation-in-part of copending application Ser. No. 238,716, filed November 19, 1962 now abandoned.

This invention relates to novel O,O-dialkyl-O-(2,5-dichloro-4-bromo-phenyl)-thiophosphates, as well as to novel insecticidal compositions containing at least one of the said thiophosphates, and to a novel method of killing insects therewith.

More particularly, the present invention relates to O,O-dialkyl - O - (2,5 - dichloro - 4 - bromo - phenyl) - thiophosphates of the formula

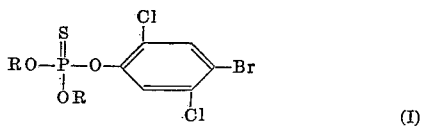

(I)

wherein R is selected from the group consisting of methyl and ethyl.

The compounds of the Formula I above may be prepared by a number of different methods involving well known chemical principles. For instance, they may be prepared by reacting an alkali metal salt of 2,5-dichloro-4-bromo-phenol with O,O-dimethyl- or O,O-diethyl-thiophoric acid chloride in the presence of an inert organic solvent, such as chlorobenzene, at a temperature between 40 and 120° C. Alternatively, they may be prepared by reacting O - (2,5 - dichloro - 4 - bromo - phenyl) - thiophosphoric acid dichloride with methanol or ethanol.

The following examples illustrate the present invention and will enable others skilled in the art to understand it more completely. It should be understood, however, that the invention is not limited to the particular examples given below.

EXAMPLE 1

*Preparation of O,O-dimethyl-O-(2,5-dichloro-4-bromo-phenyl-thiophosphate*

272.9 gm. of 2,5-dichloro-4-bromophenyl sodium (1.0 mol) were suspended in 700 cc. of chlorobenzene and the resulting solution was admixed with 176.6 gm. of O,O-dimethylthiophosphoric acid chloride (1.1 mol). The resulting mixture was heated for eight hours at 100° C. accomplished by stirring after 5 gm. of potassium bromide were added to the reaction mixture as a catalyst. After termination of the reaction, the sodium chloride which had precipitated out was filtered off. The filtrate was washed with dilute sodium hydroxide and was then dried over sodium sulfate. After distilling off the chlorobenzene, a colorless oil was obtained which crystallized after a short period of time to give a 95% yield of raw O,O-dimethyl-O-(2,5-dichloro-4-bromo-phenyl)-thiophosphate.

Upon purification by distillation or by recrystallization from methanol, 320 gm. (85.6% of theory) of the pure product having a melting point of 51° C. and a boiling point of 140–142° C. at 0.01 mm. Hg were obtained.

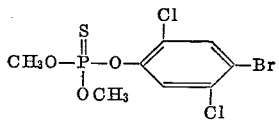

*Analysis.*—Calculated: P, 8.28%; S, 8.56%. Found: P, 8.20%; S, 8.61%.

EXAMPLE 2

*Preparation of O,O-diethyl-O-(2,5-dichloro-4-bromo-phenyl)thiophosphate*

Using the procedure of Example 1, 272.9 gm. of 2,5-dichloro-4-bromo-phenyl sodium were reacted with 186.5 gm. of O,O-diehyl-thiophosphoric acid chloride to form 380 gm. (96% of theory) of O,O-diethyl-O-(2,5-dichloro-4-bromo-phenyl)-thiophosphate.

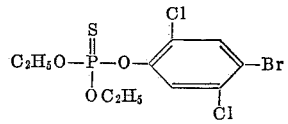

The O-halophenyl-thiophosphates according to the present invention, that is, those embraced by Formula I above, possess useful properties. More particularly, they exhibit highly effective insecticidal activities of very long duration. In addition, they are virtually free from phytotoxicity as well as toxicity toward warm-blooded animals.

For insecticidal purpoess the compounds according to the present invention are disseminated in the form of customary liquid or solid compositions, that is, compositions consisting essentially of a major amount of an inert liquid or solid carrier having an effective insecticidal amount of at least one compound of the present invention uniformly dispersed therethrough. Examples of suitable inert carriers include, but are not limited to, xylene, water, kaolin, kieselguhr and the like. The preferred concentration of the active thiophosphate in said compositions is between about 0.01 and about 3% by weight, based on the total weight of the composition. In addition to the compounds according to the present invention, the said compositions may also comprise other pesticidal agents. The compositions containing the compounds of the present invention may be in the form of suspensions, solutions, dusting powders, pastes or any of the other usual forms of insecticides.

The following examples illustrate a few insecticidal compositions comprising a compound according to the present invention as an active ingredient. The parts are parts by weight unless otherwise specified.

EXAMPLE 3

*Dusting powder*

2 parts of O,O-dimethyl-O-(2,5-dichloro-4-bromo-phenyl)-thiophosphate were sprayed upon 98 parts of kaolin, and the resulting mass was milled until homogeneous. The dusting powder thus obtained was a highly effective insecticidal powder which destroyed a variety of insects within a short period of time when the insects were brought in contact therewith, that is, when the area infested with the insects was dusted with the powder. When applied to leaf as well as coniferous plants, the powder completely eradicated the insects thereon but produced no phytotoxic damage. Similarly, when the powder was used to dust warm-blooded animals, such as cattle and other domestic animals, it completely eradicated all insects on said animals and produced no toxic effects whatsoever with respect to the animals themselves.

EXAMPLE 4

*Aqueous suspension*

25 parts of O,O-dimethyl-O-(2,5-dichloro-4-bromo-phenyl)-thiophosphate were sprayed onto 73 parts of kieselguhr, and then 2 parts of sodium naphthalene sulfonate were added thereto. The resulting mixture was milled until homogeneous, and the wettable powder thus obtained was suspended in a sufficient amount of water to make the concentration of the thiophosphate in the suspension about 2% by weight. The resulting aqueous suspension was a highly effective insecticidal composition against a variety of insects found around the farm and home. It produced no phytotoxic damage when applied to plants and no physiologic toxic effects when applied to domestic animals.

EXAMPLE 5

*Aqueous emulsion*

20 parts of O,O-dimethyl-O-(2,5-dichloro-4-bromo-phenyl)-thiophosphate were dissolved in 75 parts of xylene, and 5 parts of ricinoleic acid butyl ester sulfonate were added to the solution. The resulting mixture was emulsified in an amount of water sufficient to make the concentration of the thiophosphate component about 2% by weight, based on the total weight of the aqueous emulsion. The liquid emulsion thus obtained was a highly effective insecticidal composition against a variety of insects found around the farm and home. It produced no phytotoxic damage when applied to plants and no physiologic toxic effects when applied to domestic animals.

The same results were obtained when O,O-diethyl-O-(2,5-dichloro-4-bromo-phenyl)-thiophosphate was substituted for the thiophosphate used in Examples 3 through 5 above.

Thus, the novel method of the present invention for killing insects comprises contacting the insects with an insecticidally effective amount of at least one compound of the Formula I.

It should be understood, however, that the compositions of Examples 3 through 5 are merely illustrative of the general type of composition which may be used to disseminate the compounds of the present invention for insecticidal purposes. Obviously, the concentration of the active insecticidal component in these compositions may be varied within the previously indicated preferred limits, and the nature and amounts of the inert components may be varied to meet particular requirements.

To compare the duration of effective action of O,O-dimethyl-O-(2,5-dichloro-4-bromo-phenyl)-thiophosphate (A) of the present invention with the structurally most closely related known compound O,O-dimethyl-O-(2,4,5-trichloro-phenyl)-thiophosphate (B), separate aqueous suspensions of the two test compounds were applied to filter paper and the water was then evaporated. House flies were then placed on the filter paper at different time intervals and the $LT_{50}$ (time required to kill 50% of the flies) was determined in each instance. The results are summarized in the following table:

TABLE I

| Compound tested | Concentration, percent | $LT_{50}$ in minutes | | | | |
|---|---|---|---|---|---|---|
| | | Immediately | After 1 week | After 2 weeks | After 3 weeks | After 4 weeks |
| B | 1 | 130 | 230 | 250 | 290 | 500 |
| A | 1 | 110 | 175 | 200 | 230 | 400 |
| B | 2.5 | 70 | 130 | 240 | 250 | 500 |
| A | 2.5 | 60 | 90 | 160 | 190 | 250 |

The results of Table I clearly show that O,O-dimethyl-O-(2,5-dichloro-4-bromo-phenyl)-thiophosphate has a much longer duration of effective insecticidal action than its analog O,O-dimethyl-O-(2,4,5-trichloro-phenyl)-thiophosphate.

To compare the degree of insecticidal activity of the compounds of the invention with that of known related compounds, the $LT_{95}$ (time required to kill 95% of the test insects) was determined at a concentration of 0.05% of the test compounds. The test was performed by placing a 0.05% solution of the test compounds in methanol on a smooth, nonabsorbent base and determining the $LT_{95}$ of house flies placed thereon. The results, expressed in terms of percent activity, are summarized in the following table:

TABLE II

| Test Compound | Percent Activity $LT_{95}$ |
|---|---|
| Compounds of invention: | |
| 1. O,O-dimethyl-O-(2,5-dichloro-4-bromo-phenyl)-thiophosphate | 100 |
| 2. O,O-diethyl-O-(2,5-dichloro-4-bromo-phenyl)-thiophosphate | 90 |
| Known related compounds: | |
| 3. O,O-diethyl-O-(2,4,5-trichlorophenyl)-thiophosphate | 30 |
| 4. O,O-dimethyl-O-(2,4,5-trichlorophenyl)-thiophosphate | 62 |
| 5. O,O-dimethyl-O-(2,4,6-trichlorophenyl)-thiophosphate | 30 |
| 6. O,O-dipropyl-O-(2-bromo-4-chlorophenyl)-thiophosphate | <20 |

The results of Table II clearly demonstrate the greatly superior insecticidal activity of the compounds of the invention as compared to the known compounds.

In other words, these results show that the $LT_{95}$ of compounds Nos. 3 and 5 is somewhat more than three times as long as that of compound No. 1 and three times as long as that of compound No. 2. Similarly, compounds No. 4 and 6 have a substantially longer $LT_{95}$ than compounds No. 1 and 2.

The $LD_{50}$ (median dose fatal to 50% of the test animals) of O,O-dimethyl-O-(2,5-dichloro-4-bromo-phenyl)-thiophosphate was determined by orally administering varying amounts of the compound to adult laboratory rats; it was found to be 13.4 gm./kg. body weight.

While the present invention has been illustrated with the aid of certain specific embodiments thereof, it will be apparent to others skilled in the art that the invention is not limited to these embodiments and that various modifications may be made without departing from the spirit of the invention or the scope of the appended claims.

We claim:

1. An insecticidal composition consisting essentially of an inert carrier and uniformly distributed therethrough from 0.01 to 3% by weight, based on the total weight of the composition, of a compound of the formula

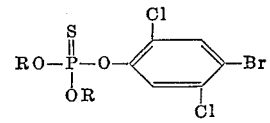

wherein R is selected from the group consisting of methyl and ethyl.

2. An insecticidal composition consisting essentially of an inert carrier and uniformly distributed therethrough from 0.01 to 3% by weight, based on the total weight of the composition, of O,O-dimethyl-O-(2,5-dichloro-4-bromo-phenyl)-thiophosphate.

3. An insecticidal composition consisting essentially of an inert carrier and uniformly distributed therethrough from 0.01 to 3% by weight, based on the total weight of the composition, of O,O-diethyl-O-(2,5-dichloro-4-bromo-phenyl)-thiophosphate.

4. The method of killing insects which comprises contacting said insects with a compound of the formula

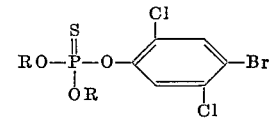

wherein R is selected from the group consisting of methyl and ethyl.

5. The method of killing insects which comprises contacting said insects with O,O-dimethyl-O-(2,5-dichloro-4-bromo-phenyl)-thiophosphate.

6. The method of killing insects which comprises contacting said insects with O,O-diethyl-O-(2,5-dichloro-4-bromo-phenyl)-thiophosphate.

References Cited by the Examiner
UNITED STATES PATENTS

| | | | |
|---|---|---|---|
| 2,828,241 | 3/1958 | Birum | 167—30 |
| 2,857,308 | 10/1958 | Baker | 167—30 |
| 2,887,505 | 5/1959 | Blair | 260—461 |
| 2,960,428 | 11/1960 | McConnell et al. | 260—461 |

JULIAN S. LEVITT, *Primary Examiner.*

FRANK CACCIAPAGLIA, JR., *Examiner.*

GEORGE A. MENTIS, *Assistant Examiner.*